United States Patent [19]

Motsch et al.

[11] 4,434,499

[45] Feb. 28, 1984

[54] SYSTEM OF NUMERICAL TRANSMISSION WITH ADAPTATIVE CODING, OF ANALOGICAL INFORMATION SAMPLED AND TRANSFORMED BY ORTHOGONAL TRANSFORMATION

[75] Inventors: Roger Motsch, Mordelles; Francoise Roussel, La Chapelle des Fougeretz; Germain Lolivier, Rennes, all of France

[73] Assignees: L'Etat Francais, represente par le Ministre des P.T.T. (Centre National d'Etudes des Telecommunications); Etablissement Public de diffusion dit "Telediffusion de France", both of France

[21] Appl. No.: 321,005

[22] Filed: Nov. 13, 1981

[30] Foreign Application Priority Data

Nov. 17, 1980 [FR] France .................................. 80 24603

[51] Int. Cl.$^3$ ............................................. H04B 1/66
[52] U.S. Cl. .................................... 375/122; 371/70; 375/38
[58] Field of Search ................. 358/133, 138, 260; 179/15.55 R; 371/70; 375/122, 25, 38, 40

[56] References Cited

U.S. PATENT DOCUMENTS

| | | | |
|---|---|---|---|
| 4,134,134 | 1/1979 | Lux | 358/138 |
| 4,155,097 | 5/1979 | Lux | 358/138 |
| 4,266,249 | 5/1981 | Chai et al. | 358/138 |
| 4,346,405 | 8/1982 | Yoda et al. | 358/138 |

Primary Examiner—Benedict V. Safourek
Attorney, Agent, or Firm—Laff, Whitesel, Conte & Saret

[57] ABSTRACT

A numerical or digital transmission system uses an adaptative coding, of analog information, which is sampled and transformed by an orthogonal transformation. The coding has a rate of data flow or delivery, which is reduced by orthogonal transformation with an adaptative threshold. In each scanning field, the binary elements of the coefficients are obtained by a basic coding with a quantification pitch 2S, (S being a whole number either positive or null). A complementary coding is transmitted. The complementary coding is obtained by adding binary elements of weights 2S-1 for each one of the coefficients, until the transmission capacity of the channel is filled. The coefficients are taken in chronological order. The invention is applicable to digital television, but also the coding may be used for transmission of high fidelity sound.

4 Claims, 12 Drawing Figures

FIG.5

| n | | | 2n+1 |
|---|---|---|---|
| 0 | 0 | | 1 |
| 1 | 10 | S* | 3 |
| 2 | 110 | S* | 5 |
| 3 | 1110 | S* | 7 |
| 4 | 11110 | S* | 9 |
| 5 | 111110 | S* | 11 |
| 6 | 1111110 | S* | 13 |
| 7 | 11111110 | S* | 15 |
| ⋮ | ⋮ | ⋮ | ⋮ |

FIG. 8

| | N° | 4 BITS | |
|---|---|---|---|
| | 1 | 1111110 | 101100 |
| | 2 | 110 | 11 |
| | 3 | 0 | |
| | 4 | 0 | |
| | 5 | 0 | |
| | 6 | 0 | |
| | 7 | 0 | |
| TRANSFORM COEFFICIENT COEFF | 8 | 0 | |
| | 9 | 10 | 0 |
| | 10 | 110 | 01 |
| | 11 | 1110 | 011 |
| | 12 | 0 | |
| | 13 | 0 | |
| | 14 | 0 | |
| | 15 | 10 | 1 |
| | 16 | 1110 | 111 |

COMPLEMENTARY CODING CODC  00000000

FIG.10

|  | N° | 4 BITS | |
|---|---|---|---|
| TRANSFORMED COEFFICIENT COEFF | 1 | 1111110 | 101100 |
| | 2 | 110 | 11 |
| | 3 | 0 | |
| | 4 | 0 | |
| | 5 | 0 | |
| | 6 | 0 | |
| | 7 | 0 | |
| | 8 | 0 | |
| | 9 | 10 | 0 |
| | 10 | 110 | 01 |
| | 11 | 1110 | 011 |
| | 12 | 0 | |
| | 13 | 0 | |
| | 14 | 0 | |
| | 15 | 10 | 1 |
| | 16 | 1110 | 111 |
| COMPLEMENTARY CODING CODC | 1 | | 1 |
| | 2 | | 1 |
| | 3 | 0 | |
| | 4 | 0 | |
| | 5 | 1 | 1 |
| | 6 | 1 | 1 |

SYSTEM OF NUMERICAL TRANSMISSION WITH ADAPTATIVE CODING, OF ANALOGICAL INFORMATION SAMPLED AND TRANSFORMED BY ORTHOGONAL TRANSFORMATION

The present invention relates to the numerical transmission systems with adaptive coding for sampled analogical information, the samples of which have been subjected to an orthogonal transformation. The invention finds an application especially in numerical or digital television in which there is a coding with a reduced rate of data flow for the purpose of transmission. The reduction is to a rate of flow of 34 Megabits per second, of the information which relates to a television image. Indeed, the invention can also be applied to the coding and to the transmission of high fidelity sound.

Numerical or digital transmission channels or paths which are standardized by the CCITT (The International Telegraph and Telephone Consultative Committee), may be used to carry television image signals or other signals at rates of flow of 140 or of 34 Mbits/s (the latter rate of flow corresponding to the third hierarchal level recommended by the CCITT). On the first type of transmission paths, it is possible to transmit the signal without any additional treatment, because the available rate of flow is equal to that of the numerical or digital signal. To utilize the second type of transmission paths, the economic interest of which is obvious, it is necessary to use a rate of flow reduction coding system.

It is well known to obtain a reduction of the rate of flow by using an orthogonal transformation, and then encoding the transformed coefficients by using a coding by threshold. The coding threshold preferably is adaptive. In practice, there are two types of treatment on the sampled image signal, which has then been numerized or digitized. The first operation consists in taking in the image a group of points ("image" matrix) and in applying to it an orthogonal transformation in a manner such that the initial whole or group, in which the points are statistically dependent, will be transformed into a more independent coefficient group or complex ("transformed" matrix). The second operation relates to the coding, properly speaking, which is performed not in the image space, but in the transformed space, by quantifying the coefficients according to a given law. In that latter operation, it is possible to bring into play psychovisual properties to determine the quantification law, and the number of binary elements to be used for each coefficient, to minimize the global subjective visibility of the error associated with the coding.

From a mathematical point of view, the orthogonal transformation operation is executed by a double matrix product. If X is the "image" matrix; Y the "transformed" matrix; H the orthogonal transformation matrix and $H^T$ its transposed one; the two-dimensional transformation is written:

$$Y = H \cdot X \cdot H^T$$

Since the transformation is orthogonal, the reverse of the transformation matrix is equal to the transposed one: $H^{-1} = H^T$ and the reverse transformation is written $$X = H^T \cdot Y \cdot H$$

The transformation matrices which can be used are varied: Hadamard, Haae, Slant-Hadamard, Fourrier, etc. In numerical or digital television, the choice is usually limited to one of the first three which permits a very simple and practical embodiment. The calculation time is very short. In the Hadamard transformation, for example, the only coefficients of the H matrix are the numbers $+1$ and $-1$. Therefore, the sole operations to be performed are additions and subtractions. In order to limit the number of operations, algorithms are used, the algorithym being of the type which are used for discreet and rapid Fourier transformation.

The complex of the modules of transformed coefficients (resulting from a series of additions and of subtractions, that is to say which may be either positive or negative) is such that its energy is equal to that of the starting image. In most cases, the quasi-totality of the energy is concentrated in a few coefficients. It is then possible to consider transmitting only those coefficients and their coordinates inside the matrix. These coefficients and coordinates are sufficient to reconstitute the image without appreciable modifications with respect to the starting image. The contribution of the eliminated coefficients is negligible at the time of the reconstruction of the image by an inverted transformation or decoding.

In order to detect a coefficient having important energy, a comparison is made with a threshold. For the sake of simplification, the thresholds are limited to whole powers of two. In the known systems, the coefficients higher than the threshold only are allowed to be transmitted with a linear quantification law, the pitch of which law is equal to the threshold.

Preferably, the value of the threshold is adaptive, and chosen so that, with a suitable coding law, the rate of flow for all of the points of the transformed matrix will be less than or equal to a fixed rate of data flow called a "nominal rate of flow or delivery", which corresponds to the delivery reduction required to transmit the signal at 34 Mbits/s. For the quality of the restituted image to be acceptable, after decoding and reversed transformation, the coding law which is used is a variable length law. Statistically, there are numerous coefficients, the amplitude of which is less than the quantification pitch, and same must be encoded with a minimum of binary elements. When, for two image matrices, identical thresholds are calculated, the number of binary elements to be transmitted with the chosen coding law is not necessarily the same.

In addition, with respect to the transformation, the rate of data flow by the coded image matrix must be equal to the nominal rate of flow. That is why the difference between the nominal rate of flow and the real rate of flow consists of arbitrary information which may be "zeros" for example. The arbitrary information is also called "packing binary elements" and is variable, depending on the treated "image matrices". Its quantity is not always negligible with respect to the nominal rate of flow. It then appears that the transformation channel is poorly utilized.

One object of the present invention is to provide a coding system with a reduction of the rate of data flow, by a transformation of the adaptative threshold type, which avoids the above-mentioned drawback.

More especially, the object of the present invention comprises using the elementary times of the "packing binary elements" to transmit an additional information called "complementary coding".

The object of the present invention is to provide for a "complementary coding", such as is defined above. The invention presents the following advantages:

the image which is reconstituted after decoding and reversed transformation is of higher quality in the systems as a result of the present invention.

the transmission channel is better used as will be seen below. At most, there is one binary element which is used as a "packing element" because the "complementary coding" transmits one or two binary elements per coefficient.

the source noise effect on the coding is attenuated. From image to image, the "image matrices" become superposed. The source noise causes, in some cases, an oscillation of the threshold between two consecutive values, thus causing a temporal variation in the luminous energy, which the "complementary coding" decreases in amplitude.

the means used to execute the "complementary coding" are very simple. The results of the threshold calculation are re-used in the basic coding in order to know which binary elements must be used for the "complementary coding".

According to a characteristic of the invention, a system in which the "complementary coding" relative top a base coding of quantification pitch $2^S$ (S being a whole number either positive or null) is obtained by adding to the binary elements of the base coding, up to a concurrence with the maximum capacity of the channel. The added binary element has the weight $2^{S-1}$ for each one of the coefficients, taken in chronological order, when the coefficient is null in the quantification scale of pitch $2^S$, and the binary element of weight $2^{S-1}$ is different from zero. In further adding, the binary element of the sign of the coefficient is taken into consideration.

It must be noted that the last sign binary element is not kept in the basic coding because the corresponding coefficient has a value which is less than to the quantification pitch $2^S$ and therefore has a value which is null in the associated quantification law.

In practice, the means to develop the "complementary coding" does require only a certain number of additional logical circuits, at the level of the coding device as well as at the decoding device.

According to a characteristic of the present invention, a numerical transmission system uses adaptative coding of sampled analogical informations. The numerized or digitized samples are subjected to an orthongonal transformation, with a rate of data flow reduction having an adaptative threshold. A coding device uses a transformer for orthogonal transformation to which the numerized or digitized samples are applied. The output of the transformer is connected, for one part, to a coding operator and, for the other part, to a threshold evaluator. The output of the evaluator is connected to the governing or control input of the coding operator. The data output of the coding operator is connected to an input of a multiplexer and the end-of-data output of the coding operator is connected to a control input of the multiplexer. The coding device further comprising a combination of a logical decoding member, one input of which is connected to the output of the transformer. Another input is connected to the output of the threshold evaluator and a third input receives a clock signal at a frequency which is double that at which the system binary elements are delivered by the transformer. A fourth input of the logical decoding member is connected to the end-of-data output of the coding operator, the output of which is connected to a data input of the multiplexer. The combination logical decoding member produces the complementary coding.

According to another characteristic of the invention, the complementary logical decoding member comprises an FPLA circuit ("Field Programmable Logic Array") and an FiFo memory ("First in - First out") such as a shift register, for example.

According to another characteristic of the invention, in the transmission system, a decoding device is constituted by a logical decoding member to which there are applied the transmitted signals. The decoding device has an output which delivers the coefficient basic data. A second output of the decoder delivers the threshold value, and a third output delivers the complementary decoding. A fourth output delivers a data validation signal. The decoding device uses an inverted transformer or decoder, the orthogonal transformation of which is the reverse of that of the coding device. The first output of the logical decoding member is connected to a first input of an OR circuit, and to a first input of a logical operator. The second output of the logical decoding member is connected to the "threshold" input of the logical operator. The third output of the logical decoding member is connected to the IN-FORE input of the operator and the fourth output is connected to the ENR input. A fourth input receives a clock signal at a frequency which is double the frequency of the binary elements supplied by the time base. The output of the logical operator is connected to the second input of the OR circuit. The logical operator treats the complementary codes. The output of the OR circuit is connected to the inverted or decoding transformer, which delivers the original codes of the signal.

The above-indicated characteristics of the present invention, as well as others, will appear more clearly upon reading of the following description of an embodiment, the description being given in relation to the attached drawing in which:

FIG. 5 is a table which defines, in a conventional coding device, the number of binary elements in the module of a coefficient.

FIG. 6 illustrates the functioning of a conventional coding device taking, for a coefficient, a numerical module example with sign and threshold.

FIG. 8 is a diagram which shows, starting from the numerical example in FIG. 7, the numerical train of the transmitted binary elements.

FIG. 10 is a diagram which shows, with the numerical example in FIG. 9, the series of the binary elements which are effectively transmitted using a coding device according to the present invention.

Figure 1:
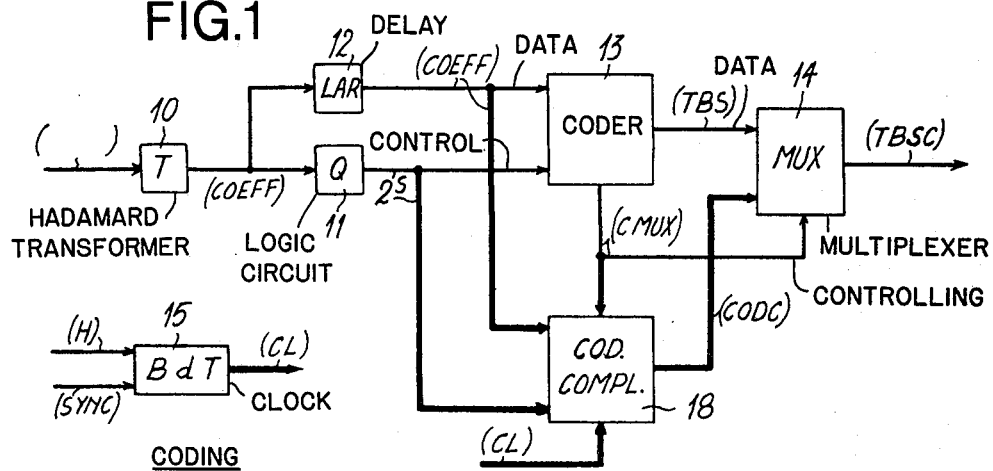
FIG. 1 is a block diagram of a coding device according to the present invention.

The diagram in FIG. 1 shows the circuits of the known coding system, represented in fine lines, and the inventive circuits of the complementary coding system, represented in heavy lines.

In the basic coding system, a Hadamard transformer 10 has its input connected to the source which delivers the image points signals. Its output is connected, for one part to the input of a logic circuit 11 and, for the other part, to the input of a delay line 12. The output $2^S$ of the logic circuit 11 is connected to a control input of a coding device 13 and the COEFF output of the delay line 12 is connected to the data input of coding device 13. The output of TBS information data of coding device 13 is connected to a data input of a multiplexer 14, while the output controlling the sending of CMUX packing data is connected to the other corresponding input of multiplexer 14 the TBSC output of which delivers the coded transformed data. The basic coding system is completed by a time base clock circuit 15.

The Hadamard transformer 10 performs the double matrix product on the data of points 4×4 sub-images. There is a decomposition following a rapid algorithm so that four operations are to be performed in series to calculate a transformed coefficient. As a result, the numerized or digitized video signal applied to the input of transformer 10 is coded according to a linear quantification law with eight binary elements, the COEFF coefficients, delivered by transformer 10. The coding is according to a linear quantification law with twelve binary elements.

The logic circuit 11 calculates the quantification pitch in a manner such that the rate of flow, relative to the coded signal, will be less than the set nominal rate of data flow. The operator supplies the value of the quantification pitch $2^S$ at the end of a calculation time period which is equivalent to the duration of 16 samples. The calculation is made according to formula (1) below.

Delay line 12 is necessary to set the COEFF signals back into phase with the signal $2^S$ delivered by logic circuit 11.

The coding circuit properly speaking, 13, produces a TBS series binary train, starting from the COEFF signals and $2^S$. The binary train is applied to the multiplexer 14 before it is applied to a transmission modulator (not represented), and it produces a CMUX signal which is applied to the multiplexer when all of the TBS train has been delivered to circuit 14.

Upon receiving the CMUX signal, multiplexer 14 inserts the "packing binary elements" to transmit the complete TBSC train at 34 Mbits/s.

Clock 15 produces all of the synchronization signals CL and clock signals which may be useful to the circuits 10 to 14 of FIG. 1. Clock 15 is controlled by a clock signal H which is extracted from the numerized or digitized samples and derived from the sampling signal, as well as the mixed synchronization signal, pertaining to any television signal.

The complementary coding system comprises a complementary coding device 18, the first or data input COEFF is connected to the output of the delay line 12, the second or control input is connected to the output of logic circuit 11, and the third or multiplex input CMUX is connected to the corresponding output of coding device 13. The coding output CODC of coding device 18 delivers the complementary coding and is connected to a third CODC input of multiplexer 14.

Thus coding device 18 utilizes the same signals as coding device utilizes to execute the setting-into-memory of the binary elements corresponding to the "complementary coding". In order to read the memory of coding device 18, the CMUX signal and the read CODC signals are applied to multiplexer 14. Multiplexer 14 transmits after the TBS signals, in priority the CODC signals. If the CODC signals are not sufficient to fill a scanning field, multiplexer 14 transmits a packing element. Indeed, it will be seen below that a possible packing element is reduced to a single binary element.

Figure 2:
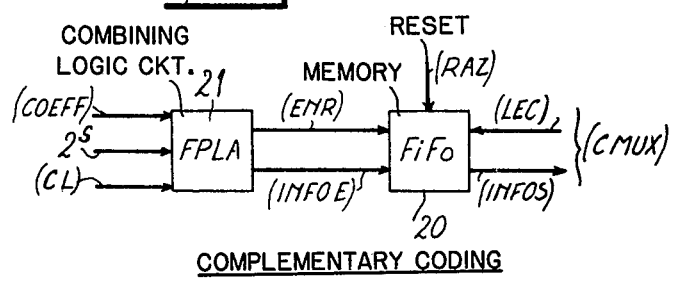
FIG. 2 is a diagram of a circuit of the coding device in FIG. 1 in which the "complementary coding" is produced.

Complementary coding device 18 is represented in more detail in FIG. 2. It comprises a combining logical decoding circuit 21 comprising three inputs, the first one of which receives the $2^S$ signal, the second one receives the COEFF data signal and the third one receives a clock CL signal which comes from the time base clock 15. Logic member circuit 21 comprises two outputs ENR and INFOE which are connected to the corresponding inputs of a FiFo memory 20 (such as a shift register). Memory 20 further comprises a reading input LEC which is connected to the CMUX output of coder 13 (FIG. 1), and an information output INFOS which is connected to multiplexer 14. Finally, it comprises a reset input connected to an output of time base clock 15.

The FiFo memory 20 has a capacity of at least 32 binary elements in series. The ENR and LEC signals respectively govern or control the recording and the reading of the FiFo memory 20. Reset signal RAZ initializes the FiFo memory 20 each time the transformed coefficients matrix is changed.

In practice, logic circuit 21 is constituted by an "FPLA" ("Field Programming Logic Array") circuit, such as the 82S100 circuit, which is a standard commercial item sold by the "SIGNETICS" Corporation.

As an example which is not limitative, there will first be described an adaptative threshold coding to examine the improvement brought by the "complementary coding". After calculation of the threshold, the different levels of the quantification scale are numbered with a variable length code which can be decomposed into two parts:
 a prefix comprising n "1" and 1 "0", which indicates that the coded coefficient comprises n information binary elements.
 an information word which comprises (n−1) binary elements having the absolute value of the coefficient in the new quantification scale, the heavy weight or most significant binary element being omitted, plus the binary sign element.

It may be seen that the prefix defines the position of the most significant binary element which is not null in the coefficient module. It is, therefore, useless to transmit it and it may be replaced by the binary element giving the sign of the coefficient. FIG. 5 gives the binary elements to be transmitted as a function of the number n of the module's binary elements in the new quantification scale. The number of the binary elements to be transmitted is (2n+1) for a coefficient the module of which comprises n binary elements in the new quantification scale the pitch of which is equal to the threshold. FIG. 6 gives an example of the coding of a coefficient in the case in which the threshold is such that S=4. The prefix to be transmitted is established according to the above-illustrated rule, as well as illustrated in FIG. 5. The double arrows indicate the significant binary elements which are effectively transmitted.

For a transformed block having a size 4×4, the rate of flow $D_S$ which corresponds to a threshold $2^S$ is:

$$D_S + \sum_{i,j=0}^{4} (2n_{ij} + 1) + K$$

where:
  $n_{ij}$ is the number of binary elements in the module of the transformed coefficient, the coordinates of which are (i,j) in a quantification scale the pitch of which is equal to the threshold, and
  K is a fixed number of binary elements which indicated the threshold used for the block (K being equal to 4 in the example in FIG. 6).

Figure 12:
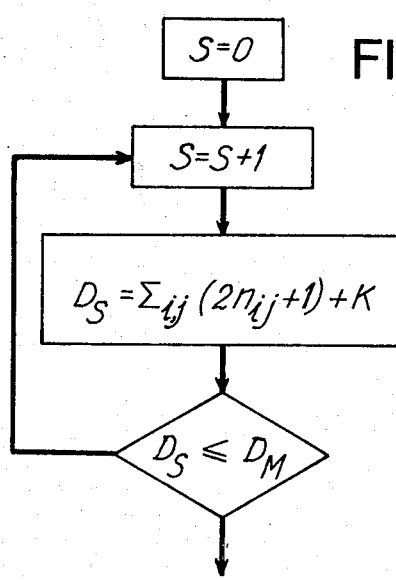
FIG. 12 is a flow chart which illustrates the calculation of the threshold.

In practice, in order to determine the value of threshold $2^S$ which is used for the coding, there is a procedure as follows: The threshold is first initialized at zero by a reset signal RAZ. Then, the threshold is increased by one unit until the corresponding rate of data flow or delivery $D_S$, calculated by means of the above formula, is either lower than or equal to the nominal rate of flow or delivery $D_M$. The flow chart in FIG. 12 illustrates the calculation of the value of threshold S.

Figure 7:
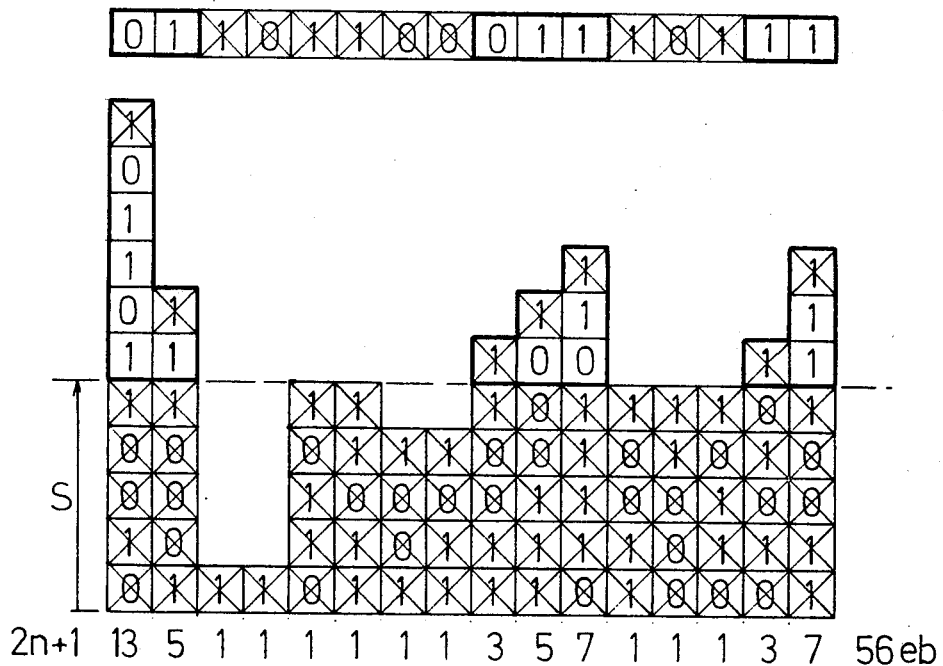
FIG. 7 is a diagram which shows, a numerical example of a 4×4 matrix of transformed coefficient, the selection of the binary elements to be effectively transmitted in a known coding device.

FIGS. 7 and 8 give an example of a transformed block. Following the above-defined rule and illustrated in FIGS. 5 and 6, the prefixes and the binary elements are determined which are transmitted and those which are not transmitted are barred. FIG. 8 clearly indicates, coefficient by coefficient, the binary elements which, set in series, form the TBS signal. Not all of the $D_M$ binary elements reserved for each one of the blocks all used; therefore, there is a poor occupation or utilization of the transmission channel capacity. Indeed, after having calculated the threshold S and the rate of flow or delivery $D_S$ which corresponds to that threshold, the number of binary elements available on the transmission channel for the treated block comprises $D_M-D_S$ binary elements. In the example illustrated in FIGS. 7 and 8, $D_M=64$ Bits and $D_S=56$ bits. Therefore it is necessary to add eight packing bits, which is indicated in FIG. 8.

According to the present invention, that remainder is used to transmit a complement of information in order to improve the coding of the data block.

The complementary information to be transmitted is determined by treating, in succession, the points in the order of output from the transformer, until the available space has been exhausted. For each coefficient, there is transmitted the binary element of weight $2^{S-1}$. When the module of the coefficient has an amplitude A such that $$2^{S-1} \leq A < 2^S$$

There is transmitted, in addition, the sign binary element of the coefficient.

Figure 9:
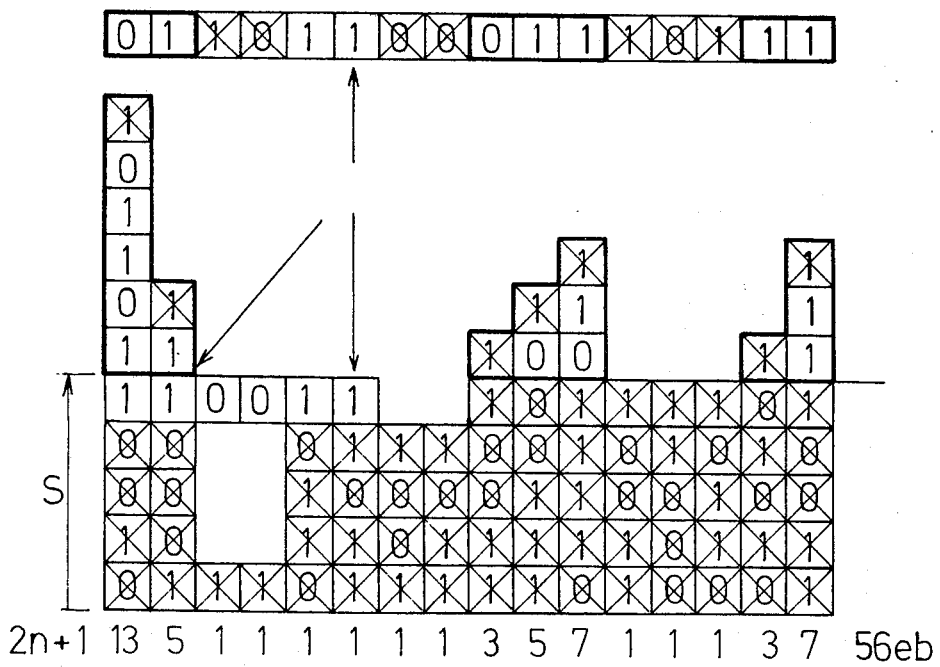
FIG. 9 is a diagram which illustrates, taking the same numerical example as in FIG. 7, the selection of the binary elements of the complementary coding, obtained according to the present invention.

FIG. 9 illustrates how, starting from the same coefficients, as in FIG. 7, there is obtained, according to the present invention, an improved coding for the same block. It will be noted that for the first six coefficients available at the output of the transformer, the quantification scale is linear, with a pitch $2^{S-1}$. For the last ten coefficients of the block, it is a linear scale of pitch $2^S$. This amounts to using, for the first six coefficients, a quantification scale having twice as many levels, that is to say those six coefficients are transmitted with a greater precision than the others.

The improvement consists in cutting off only (S−1) binary elements for the first six coefficients, instead of the S binary elements in a non-improved threshold type coding. The sending of only (S−1) binary elements causes the appearance of new coefficients which are null in the non-improved threshold type coding (for example coefficients No. 5 and No. 6 in FIG. 9). For those coefficients, it is necessary to transmit not only the binary elements of weight $2^{S-1}$, but also the sign binary element because the latter has not been transmitted by the non-improved threshold type coding. In FIG. 9, heavy lines show the complementary bits to be transmitted with their respective values. FIG. 10 indicates the place of those binary elements in the transmission scanning field.

Figure 3:
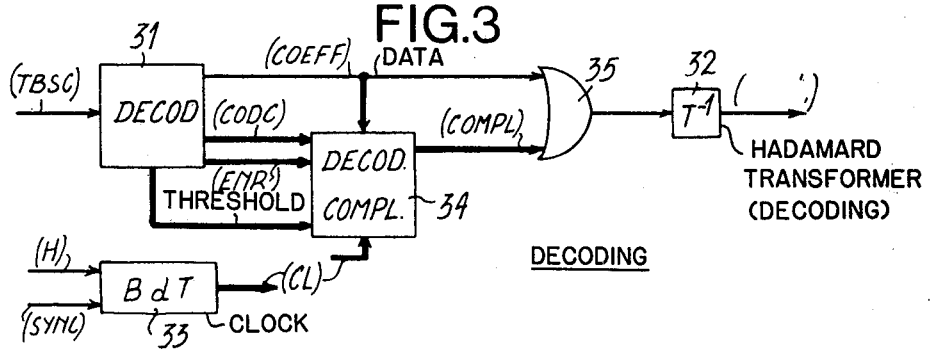
FIG. 3 is a block diagram of a decoding device according to the present invention.

With reference now to FIG. 3, there will first be described a known decoding device capable of decoding the signals transmitted by the known part of the coding device in FIG. 1. The known part of the decoding device which is under consideration is drawn in fine lines. This known part of the decoding device comprises a logical decoding circuit 31 to the inputs of which are applied the coded signals coming from the coding device in FIG. 1. The COEFF output of member 31 is then connected (directly, without passing through OR gate 35) to an inverted Hadamard transformer ($T^{-1}$) or decoder 32 which delivers the reconstituted numerized or digitized video signal. It also comprises a time base clock 33.

The logic circuit 31 decodes the series binary pulse train which is coming in, separating the information relative to the transformed coefficients COEFF, the value of the threshold quantification pitch associated with the coding, and the "packing binary elements" CODC, as well as an ENR signal which validates the latter. The ENR signal is sent by decoder 31 as soon as logic circuit member 31 has transmitted the sixteenth COEFF transformed coefficient.

The inverted Hadamard transformer 32 performs the double matrix product on 4×4 size matrices of transformed COEFF coefficients and, therefore, from the COEFF signal, it executes the points numerized or digitized video signal.

The time base clock 33 produces all of the synchronization and clock signals which are useful for all of the circuits of the decoding device, responsive to the clock signal H which is reconstituted from the received train and from the television synchronization signals.

As further shown in FIG. 3, the decoding device, according to the present invention comprises, in addition to circuits 31 to 33 in fine lines, a logic decoding circuit 34 and an OR gate 35 both of which are drawn in heavy lines.

The logic decoding circuit 34 has an input connected to the COEFF output of the decoder 31, a second input INFOE connected to an output of decoder 31 which delivers binary elements of the complementary coding CODC, a third input connected to an ENR output of decoder 31 which validates the CODC signal and a fourth input connected to the THRESHOLD output of decoder 31 which delivers the threshold value. The COMPL output of complementary decoder 34 is connected to an input of the OR gate 35, the other input of which is connected to the COEFF output of decoder 31 and the output of which is connected to the input of transformer 32. Thus, in that case, the OR gate transmits the COEFF signal to transformer 32.

Figure 4:
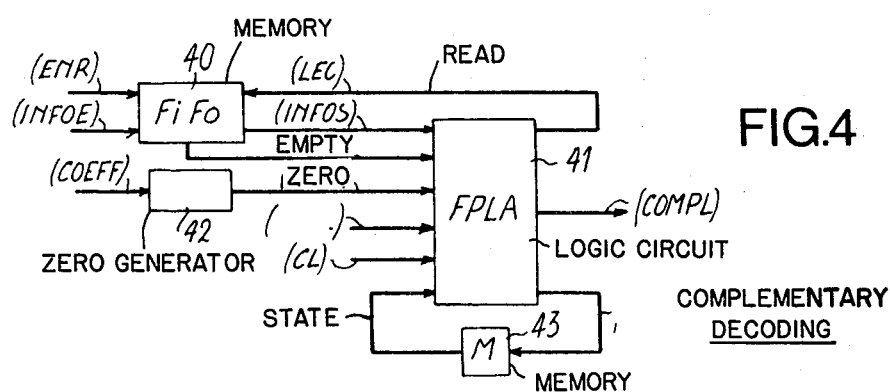
FIG. 4 is the diagram of the circuit used in the decoding device in order to produce the "complementary coding" which is used in the reconstituted image.

Decoder 34 executes the decoding of the binary elements which constitutes the complementary decoder CODC signal which transports the information relative to the complementary coding, i.e. the object of the present invention. Decoder 34 is represented in more detail in FIG. 4. It comprises an FiFo memory 30, a logic circuit 41, a generator 42 for the signal 'zero' and a memory 43.

The FiFo memory 40 is provided to store at least 32 binary elements in series. Its mode of operation is identical with that of memory 20 in FIG. 2. It comprises an INFOE input connected to the CODC ouput of circuit 31 (FIG. 3), an INFOS output connected to an input of logic circuit 41, an ENR input connected to an output of decoder 31, a reading input LEC connected to an output of circuit 41 and, finally, and an empty control output signal EMPTY is applied to a control input of logic circuit 41. The empty control flag or signal is produced internally in the FiFo memory 40. It makes it possible to know when all of the information present in the memory has been completely read.

The sequential logical decoding member 41 produces the reading control signal LEC of the FiFo memory as well as the complete signal which is the part of the decoded signal corresponding to the complementary coding. An "FPLA" circuit is used to execute the combinatory decoding and makes it possible to produce LEC and COMPL.

Memory 43 has the capacity of one binary element. It has its input connected to a STATE output of logic circuit member 41. Its output is connected to indicate the characteristic of the state of member 41. That STATE signal variably defines whether it is necessary to extract the binary sign element from the FiFo memory 40, in addition to the binary element which corresponds to the threshold $2^{S-1}$.

The ZERO signal generator 42 has its input connected to the COEFF output of decoder 31 and its output is connected to the ZERO input of logic circuit member 41. It delivers a signal when the value of its input signal is null during the basic decoding.

The signals on which the decoding is performed, therefore, are:
 the ZERO signal,
 the THRESHOLD signal which represents the value of the quantification pitch associated with the basic coding and which is supplied by decoder 31.
 the STATE signal which is internal to the sequential decoding system,
 the INFOS and EMPTY signals which are supplied by the FiFo memory 40,
 the CL signal supplied by the time base clock 33 of the decoding device which, as in the coding device, FIG. 2, cuts up the period of the COEFF signal into two equal half-periods so that it is possible to read, when needed, two binary elements per period in the FiFo memory 40. The principal of the decoding is as follows:
As long as the FiFo memory 40 is not empty, a state persists which is characterized by a null EMPTY signal:
 during the first half-period defined by the first state of the clock signal CL, the read signal LEC is sent, that being translated by the reading of the FiFo memory 40; the INFOS information read-out produces a completed signal COMPL on the numbered binary element $2^{S-1}$. When the treated coefficient of COEFF is equal to zero, which is translated by a ZERO signal equal to "1", and when the INFOS signal has a value of "1", the STATE signal is put to "1", to come and read the sign binary element in the FiFo memory 40 during the second half-period, if not, the STATE signal is at zero, and the system is kept in that state.
 during the second half-period defined by the second state of the CL signal, if the STATE signal has a value of 0 at the output of memory 43, the read signal LEC is null and the complete signal LEC keeps the same value that it had during the first half-period; if the STATE signal has a value of "1" at the output of memory 43, the read signal LEC is set at "1" to cause another reading of the FiFo memory 40 in order to position the read INFOS binary element to rank number 12, which corresponds to the number of the sign binary element of the COMPL signal; in addition, the binary element numbered $2^{S-1}$ takes on the value of "1".
 when the FiFo memory 40 is empty, the EMPTY signal is equal to "1", so that the COMPL signal takes on the value of zero.

The simplified adding device, constituted by the OR gate 35, adds the signal COMPL to the COEFF signal. In practice, that adding device is composed of twelve logical OR gates with two inputs connected between the binary elements of the same numbers of the COMPL and COEFF signals.

Figure 11:
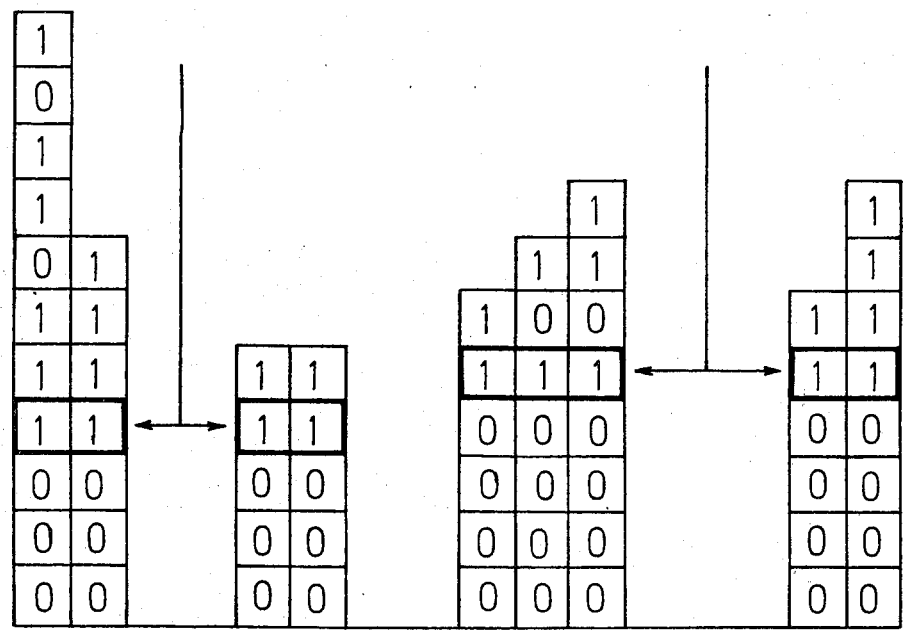
FIG. 11 is a diagram which illustrates, taking the same numerical example as in FIG. 7, the table of the numerical samples reconstituted by the decoding device according to the present invention.

The values of the coefficients transmitted to and used at the reconstruction of the image are differentiated from the values of the coefficients prior to the coding by a truncation of S or of (S−1) binary elements of low weight or of the least significance. To decrease the subjective effect of that truncation error, the most significant weight binary element, among those which have been truncated, is forced to "1", except for the null coefficients, as shown in FIG. 11. That amounts to centering the reconstitution level over all of the levels which have been mingled by the law coding.

Although the embodiment according to the present invention, which has just been given applies to television, it should be understood that any numerical or digital transmission in which a reduction of the rate of flow or delivery is desirable, can benefit from the same arrangements. Especially, those arrangements apply to the coding and to the transmission of high fidelity sound in which the rate of data flow or delivery reaches important levels, at which it is advantageous to bring back more conventional values. The orthogonal transformation may further be used by regrouping into packs, the samples of the consecutive numerized or digitized signals and by applying to them the adaptative threshold coding followed by a complementary coding. The role played by the line and scanning field synchronization signals is attributed to the scanning field synchronization signals of the numerical or digital train.

The embodiments, which have just been described, are supposed to be manufactured with components having a speed of operation of which satisfies the requirements of television.

For other applications in which the speed would be slower, it is possible to use other components or other technologies. With the microprocessors, for example, which at present treat only low-frequency signals, the wired logic would be replaced with a programmed logic to obtain the same results. The wide progresses in the performances of microprocessors makes them suitable to perform that treatment at the speed of television signals. As a variation, the described tasks could be fulfilled by one or several specialized integrated circuits.

We claim:

1. A system for transmitting over a data channel digital signals with transmission occurring at a reduced data flow rate and coding accomplished by orthogonal transformation with an adaptative threshold on each scanning of data, the binary elements of the coefficients being obtained by a basic coding of a quantification pitch of $2^S$, (S being either a positive or a null of a whole number, the system comprising means for transmitting a complementary coding responsive to adding binary element of weight $2^{S-1}$ for each one of the coefficients, the adding being up to a maximum capacity of the channel, means for taking said coefficients in chronological order, and means responsive to a null coefficient in the quantification scale of pitch $2^S$ and to a binary element $2^{S-1}$ of weight which is different from zero for further adding a sign binary element representing the coefficient under consideration.

2. A digital transmission system with an adaptative coding of sampled analogic information, the coding being digitized samples which are binary bits which have been subjected to an orthogonal transformation, with an adaptative threshold type of reduction of data flow rate, said system comprising coding means having an orthogonal transformation transformer means to which the digitized binary bits are applied, threshold evaluating means for detecting a predetermined data flow rate, multiplexer means, coding circuit means responsive to said transformer and to said threshold evaluating means for delivering a coded output of data to an input of said multiplexer means, said coding circuit means further comprising a combining logic decoding means having one input coupled to the output of said transformer means, another input of said logic decoding means being coupled to the output of said threshold evaluation means, and a third input of said logic decoding means being driven by a clock signal which recurs at a frequency which is twice the frequency of the binary bits delivered by said transformer, and a fourth input coupled to an end of data output of the coding circuit means, and an output of said coding means being connected to a data input of said multiplexer means, said logic decoding means producing a complementary coding.

3. A system according to claim 2, characterized in that said logic decoding means comprises a field programmable logic array means, and first in first out memory means, the field programmable logic array means having two outputs respectively connected to recording and data inputs of the first in first out memory means, reading input means coupled to said memory means for responding to an end of data signal out of the coding circuit means, and data output means on said memory means connected to the input of said multiplexer means.

4. A transmission system according to claim 2 or 3, and a decoding means comprising a logical decoding means which receives the transmitted signals, said logical decoding means having an output which delivers basic data relating to coefficients, a second output which delivers complementary data, a fourth output which delivers a signal for validation of the data, and inverted transformer means for decoding the orthogonal transformation with respect to the output of the coding means, the first output of said logical decoding means being connected to a first input of an OR circuit, and to a first input of a logic operator means, said logic operator means responding to the complementary codes, a second threshold output of said logic decoding means being coupled to an input of said logic operator means and a logic fourth output of said logic decoding means being connected to receive said fourth output signal having a frequency which is twice the binary bit rate, the output of said logic operator means being coupled to a second input of the OR circuit, and the output of the OR circuit being coupled to the inverted transformer means for delivering the codes of the signal.

* * * * *